(12) United States Patent
Kim

(10) Patent No.: US 9,451,058 B2
(45) Date of Patent: Sep. 20, 2016

(54) APPARATUS FOR PARTITIONING COMPRESSED SATELLITE IMAGE AND THE METHOD THEREOF

(71) Applicant: G-SOLUTION, INC., Daejeon (KR)

(72) Inventor: Tae Hoon Kim, Daejeon (KR)

(73) Assignee: G-SOLUTION, INC., Daejeon (KR)

( * ) Notice: Subject to any disclaimer, the term of this patent is extended or adjusted under 35 U.S.C. 154(b) by 183 days.

(21) Appl. No.: 14/358,555

(22) PCT Filed: Feb. 18, 2013

(86) PCT No.: PCT/KR2013/001229
§ 371 (c)(1),
(2) Date: May 15, 2014

(87) PCT Pub. No.: WO2013/133544
PCT Pub. Date: Sep. 12, 2013

(65) Prior Publication Data
US 2014/0313972 A1   Oct. 23, 2014

(30) Foreign Application Priority Data

Mar. 9, 2012   (KR) .................. 10-2012-0024184

(51) Int. Cl.
| G06K 9/36 | (2006.01) |
| G06K 9/46 | (2006.01) |
| H04L 29/06 | (2006.01) |
| G06F 17/30 | (2006.01) |
| H04B 7/185 | (2006.01) |
| H04N 19/63 | (2014.01) |
| H04N 21/61 | (2011.01) |
| H04N 19/65 | (2014.01) |

(52) U.S. Cl.
CPC ........... *H04L 69/22* (2013.01); *G06F 17/3028* (2013.01); *H04B 7/1851* (2013.01); *H04N 19/63* (2014.11); *H04N 19/65* (2014.11); *H04N 21/6143* (2013.01)

(58) Field of Classification Search
CPC . G06F 17/3028; H04B 7/1851; H04L 69/22; H04N 19/63; H04N 19/65; H04N 21/6143
See application file for complete search history.

(56) References Cited

U.S. PATENT DOCUMENTS

| 7,181,076 B1* | 2/2007 | Payton ................... H04N 19/60 |
| | | 375/E7.226 |
| 2005/0226143 A1* | 10/2005 | Barnhart ................. H04L 12/26 |
| | | 370/216 |

(Continued)

FOREIGN PATENT DOCUMENTS

| KR | 10-2010-0003167 | 1/2010 |
| KR | 10-0945733 B1 | 3/2010 |
| KR | 10-1017433 B1 | 2/2011 |

OTHER PUBLICATIONS

International Search Report and Written Opinion dated Mar. 28, 2013, from the corresponding PCT/KR2013/001229.

(Continued)

*Primary Examiner* — Phuoc Tran
(74) *Attorney, Agent, or Firm* — Katten Muchin Rosenman LLP

(57) ABSTRACT

Disclosed an apparatus and method of partitioning compressed satellite image, and more specifically, the present invention relates to a technique for forming index information on the compressed satellite image using the starting point and the length of a compressed section so as to randomly access each compressed section in the wavelet-based compressed satellite image recommended through CCSDS. The present invention minimizes costs for long-term storage of the satellite image data by immediately indexing, partitioning, and storing the compressed satellite data in a storage without recovering the compressed satellite data, rapidly provides high-quality satellite images for users by minimizing information loss while recovering the compressed image, and thereby being effective for being able to reduce computing resources needed to recover the compressed image data.

10 Claims, 7 Drawing Sheets

(56) References Cited

U.S. PATENT DOCUMENTS

2009/0324112 A1    12/2009  Park
2011/0106780 A1*   5/2011  Martinez
                         Heras ................ G06F 17/30988
                                                    707/705

OTHER PUBLICATIONS

Seo, Seok-bae, Ku, In-hei, CCSDS 122.0-B-1: High resolution satellite image compression technology, Current industrial and technological trends in aerospace v.6 No. 2, pp. 90-98, 2008. See Abstract, Chap 3. CCSDS 122.0-B-1.

* cited by examiner

| DC | $p_0$ | $C_{00}$ | $C_{01}$ | $H_{00,0}$ | $H_{00,1}$ | $H_{01,0}$ | $H_{01,1}$ |
|---|---|---|---|---|---|---|---|
| $p_1$ | $p_2$ | $C_{02}$ | $C_{03}$ | $H_{00,2}$ | $H_{00,3}$ | $H_{01,2}$ | $H_{01,3}$ |
| $C_{10}$ | $C_{11}$ | $C_{20}$ | $C_{21}$ | $H_{02,0}$ | $H_{02,1}$ | $H_{03,0}$ | $H_{03,1}$ |
| $C_{12}$ | $C_{13}$ | $C_{22}$ | $C_{23}$ | $H_{02,2}$ | $H_{02,3}$ | $H_{03,2}$ | $H_{03,3}$ |
| $H_{10,0}$ | $H_{10,1}$ | $H_{11,0}$ | $H_{11,1}$ | $H_{20,0}$ | $h_{20,1}$ | $H_{21,0}$ | $H_{21,1}$ |
| $H_{10,2}$ | $H_{10,3}$ | $H_{11,2}$ | $H_{11,3}$ | $H_{20,2}$ | $H_{20,3}$ | $H_{21,2}$ | $H_{21,3}$ |
| $H_{12,0}$ | $H_{12,1}$ | $H_{13,0}$ | $H_{13,1}$ | $H_{22,0}$ | $H_{22,1}$ | $H_{23,0}$ | $H_{23,1}$ |
| $H_{12,2}$ | $H_{12,3}$ | $H_{13,2}$ | $H_{13,3}$ | $H_{22,2}$ | $H_{22,3}$ | $H_{23,2}$ | $H_{23,3}$ |

Block

☐ : No. 1 Segment
☐ : No. 2 Segment
☐ : No. 3 Segment
☐ : No. 4 Segment

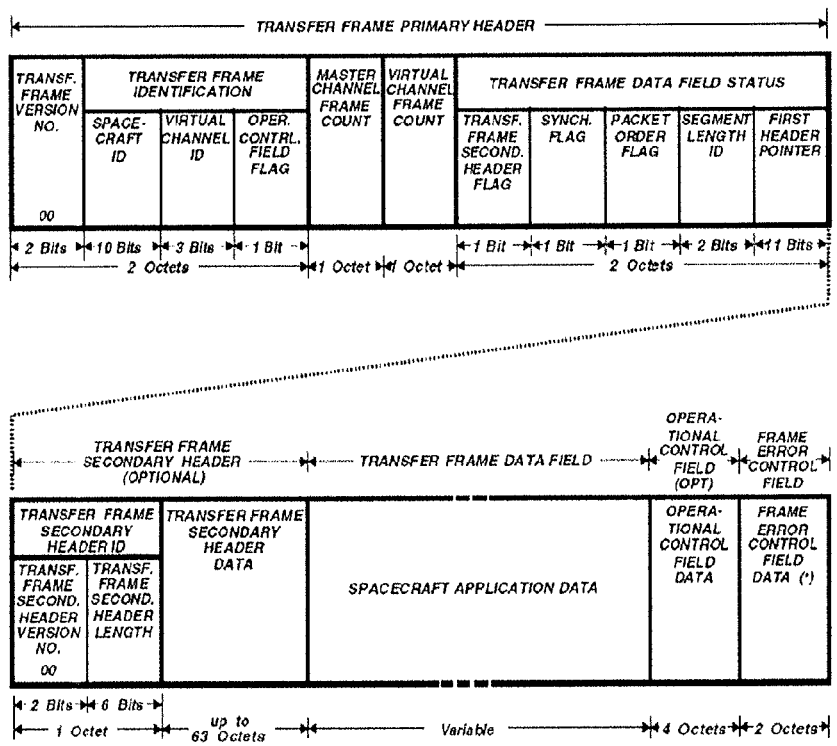

APPARATUS FOR PARTITIONING COMPRESSED SATELLITE IMAGE AND THE METHOD THEREOF

TECHNICAL FIELD

Disclosed an apparatus and method of partitioning compressed satellite image, and more specifically, the present invention relates to a technique for forming index information on the compressed satellite image using the starting point and the length of a compressed section so as to randomly access each compressed section in the wavelet-based compressed satellite image recommended through CCSDS (consultative committee for space data system).

BACKGROUND

As observation technologies through satellite evolve, high-precision (or definition), high-resolution satellite images have been able to be acquired. The utilization of these satellite images is increasing in many areas, such as monitoring and analysis of crops, land management, cartography, defense, environmental management, etc. However, very large amount of data have to be transferred and processed for high-precision (or definition), high-resolution satellite images.

Therefore, highly efficient data compression techniques are required for delivering large amounts of satellite image data from satellite to the ground by using limited frequency resources, and so far mostly DCT-based JPEG-like compression method has been adopted for this satellite image data compression. However, DCT-based compression method occurs blocking noise, which causes the distortion factor to be generated and then the quality of the satellite images to be degraded, and thus additional processing for compensating the distortion was required.

In order to complement the disadvantages of DCT-based JPEG-like methods and to get a higher image quality with the same compression ratio, wavelet-based compression technique used in JPEG2000 was applied, and CCSDS, which is an international consultative body with respect to data communications in the field of space for the compression of satellite images, recommends wavelet-based image compression methods optimized for the images observed in satellites.

FIG. 1 shows the figure of LEO (Low Earth Orbit) satellite observations by the prior arts. LEO satellites are currently used for the acquisition of high resolution satellite images, and ground observations are performed by photographing the surface of ground area within observable viewing angle and swath in the middle of moving the satellite along its orbit and transmitting images to the ground.

FIG. 2 shows the shape of step-by-step process of satellite observations images by conventional prior arts, and the shape becomes the form of strip. The number of column of image in the shape of strip is fixed value in accordance with the resolution and swath of the satellite image, the number of line is variable over time, and the value is very large from hundreds of thousands to millions of lines. Satellite image data transferred to the ground is stored as image product after processing the image data at each level, or provided to users. The number of each level and the operations performed in each level can be differently designated depending on satellite, but the level can be divided into level, 0 (1), 1A (2), 1R (3), 1G (4) in general. Each level is defined as follows.

Level 0 (1): Images made in the form of strip by channel decoding, decrypting and decompressing the data received from the satellite.

Level 1A (2): Performing tasks for combining images in each observation wavelength by using level 0 images or some compensations tasks. The shape (form) of image is in the form of strip like the image in level 0.

Level 1R (3): Performing tasks compensating radiometric characteristics by using level 1A images. The shape (form) of image is in the form of scene.

Level 1G (4): Performing tasks compensating geometric characteristics by using level 1R images, and outputting images being mapped into a map.

In the most of the conventional satellite image processing method, compressed images are transmitted from satellite as shown in FIG. 2 in the form of strip and then decompressed. And images ordered by a user are produced by processing the radiation correction and geometric correction. The uncompressed images are stored in a long-term storage in the state that various calibrations are processed in order to produce additional images. The shape to be stored in a long-term storage is level 0 (1) or level 1A (2). Level 1R (3) and level 1G (4) are the form in which images are provided to a buyer ordering the images.

This kind of processing method has the following disadvantages.

First, images are stored in long-term storage in uncompressed state, and thus the construction costs and TCO (Total Cost Ownership) for constructing storage system for storing data are severely required.

Secondly, images are stored by applying algorithms, radiation calibration, geometric correction, etc., to compensate for various distortions of satellite prior to storing images in long-term storage, and thus it is impossible to improve the quality of images for the previous images prior to the application time point of the improved compensation algorithms because original images cannot be recovered even improved compensation algorithms are developed.

Thirdly, it takes a long waiting time for a user to acquire usable images, because of uncompressing the strip images transmitted from satellite and performing calibration process for the images.

Fourthly, in the case of continuously storing compressed satellite image data in the wavelet-based compression method recommended from CCSDS, if an error occurs in the data due to noise during transmitting the data from satellite, it is impossible to process the remaining data from the part where the error occurs because there is no identifier that can identify the compressed segment in the compressed satellite image data.

FIG. 3 shows the structure of a conventional compressed satellite image file, where it comprises heather (10) and data (11). There is a fixed pattern identifier which can identify the beginning of each compressed segment in the header, and thus the image data in any compressed interval can be independently decompressed. However, there is a problem that the entire frame should be decompressed in a sequence in order to decompress each compressed section because there is no fixed pattern identifier (marker) being able to identify each segment in the header of wavelet-based compression method recommended in CCSDS.

A method of approaching any line of a strip type image is disclosed in Korean Patent No. 0945733, in which the method allows random access, not sequential, to an images section requiring decompression by using index file which is made for the information for each block interval of a compressed image. Wherein, index information consisting of starting position and the length for the interval of image line block data unit is generated. There is a fixed pattern identifier identifying the start point in the image line block data, and thus index information can be generated by identifying this identifier. Moreover, the index for random access is generated with physical location information of each image line data in the stored file for the line data of line-by-line compressed image. This method is available in the existing DCT-based compression method, but wavelet-based compression scheme does not have distinguishable identifier for a compressed segment, and it is the reason why the relationship between each compressed interval is not independent each other due to the characteristics of wavelet transform.

SUMMARY

The present invention is invented in order to resolve the problems of the conventional prior arts described above, and the objectives of the present invention are to identify each compressed image interval by using source packet being defined in CCSDS recommendation Packet Telemetry (CCSDS 102.0-B-5) in order to enable random access for the compressed data by the compress method based on wavelet transform recommended by CCSDS, minimize the costs for long-term storage of the satellite image data by storing the compressed data without decompression and the index information comprising starting point and the length of the interval in a storage, provide satellite image having better quality to a user by preventing the information loss occurred in the course of correcting the images after decompressing the compressed images, and provide satellite images to a user faster as well as save the computing resources required for long-term storing of compressed images data.

In order to achieve the above objectives, the apparatus and method for segmenting satellite compressed image in accordance with the present invention is characterized by comprising; receiving source packet including satellite compressed image segments continuously transmitted from satellites; extracting satellite compressed image segments and the length information of said satellite compressed image segments from said received source packet; generating index of said satellite compressed image segments by using said length information and the subsequent starting location; and storing said satellite compressed image segments and said generated index.

Wherein, said source packet comprises source data comprising auxiliary data field comprising variable sized satellite compressed image segments, and satellite attitude and position information; and packet data comprising header data including property information of said source data; and the length information of said packet data.

Said compressed satellite image segments are generated through wavelet transform and BPE (bit plane encoding), Next said continuous starting position is calculated by adding the length of the previous satellite compressed image segments from the starting position of the previous satellite compressed image segments, Said stored specific compressed satellite image segments are independently decompressed to original image by additionally referring to previous 3 segments and next 3 segments.

The apparatus and method for partitioning compressed satellite image in accordance with the present invention have effective to directly store the compressed satellite image data with index in a storage without decompression, to minimize the costs for long-term storing of the compressed satellite image data, to provide a better quality of satellite image to a user by preventing information loss occurred in the course of correcting said images after decompressing the compressed images, and provide satellite images to a user faster as well as save the computing resources required for long-term storing of compressed images data.

BRIEF DESCRIPTION OF THE DRAWINGS

The accompanying drawings, which are included to provide a further understanding of the invention, illustrate the preferred embodiments of the invention, and together with the description, serve to explain the principles of the present invention. In drawings:

FIG. 9 shows a fundamental structure of a transport frame in accordance with a preferred embodiment of the present invention.

FIG. 10 shows the structure of consecutive CADU in accordance with a preferred embodiment of the present invention.

DETAILED DESCRIPTION

Hereinafter, the apparatus and method of partitioning compressed satellite image in accordance with preferred embodiments of the present invention are described in detail with reference to the accompanying drawings.

Figure 1:
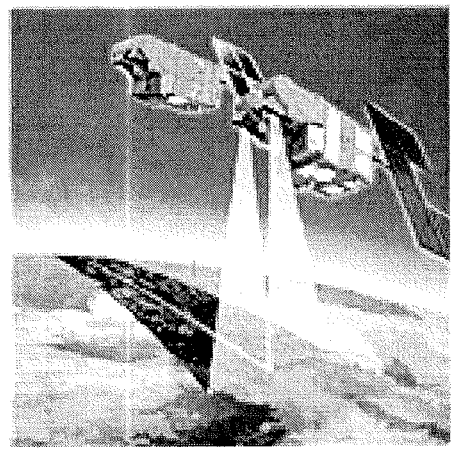
FIG. 1 shows low earth orbit satellite observations in accordance with conventional prior arts.
Figure 2:
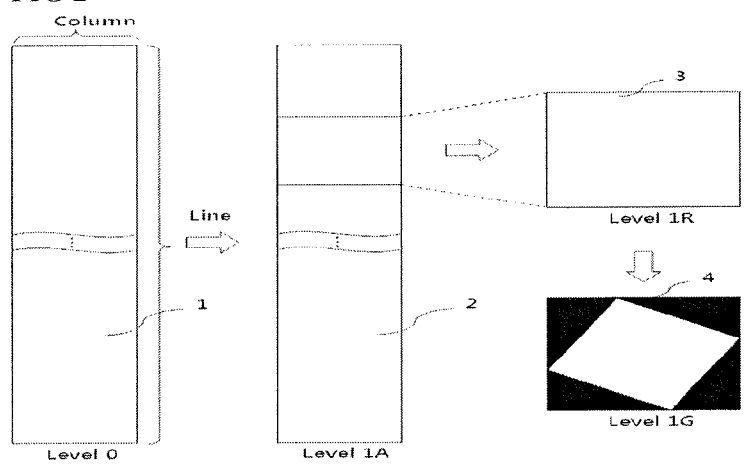
FIG. 2 shows step-by-step processing flows and image shape of satellite observation image in accordance with conventional prior arts.
Figure 3:
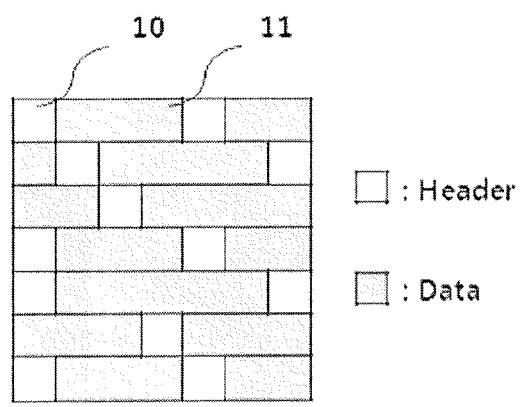
FIG. 3 shows the structure of a compressed satellite image file in accordance with conventional prior arts.
Figure 4:
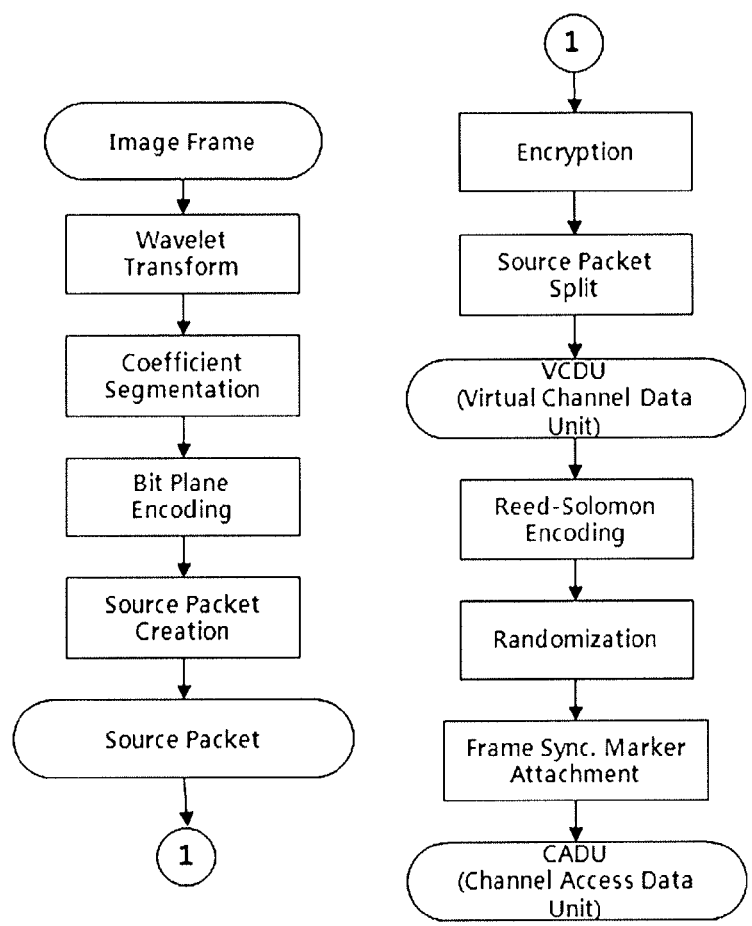
FIG. 4 shows the flows of step-by-step processes for compression and transmission of satellite images in accordance with a preferred embodiment of the present invention.

FIG. 4 shows the flows of step-by-step processes for compression and transmission of satellite images in accordance with a preferred embodiment of the present invention, especially the flowchart of compressing and transmitting the strip shaped satellite image data with wavelet transform and BPE according to CCSDS. Said strip shaped satellite image data is divided into a plurality of image frames, and each image frame is wavelet transformed with the unit of a frame. A plurality of segments comprise said wavelet transformed coefficients, each segment is encoded with a bit plane encoding (CCSDS BPE coded segment), a source data comprises at least more than one said segments, and a source packet is created by adding a header to said source data. Said source packet is encrypted, encrypted source packet is separated and VCDU (Virtual Channel Data Unit) is created, transport frame data field is generated by performing randomization after Reed-Solomon Encoding that of attaching VCDU header to said VCDU, and then transport frame can be created by attaching transport frame header to said transport frame data field. CADU (Channel Access Data Unit) is created by adding frame synchronization identifier (marker) to said transport frame and CADU becomes to be transmitted through a channel.

So far, the flow for compressing the source image frame and then transmitting the compressed source image is described and hereinafter said flow will be described in more detail. First of all, the processes for compressing the source image frame and creating source packet are explained.

Figure 5:
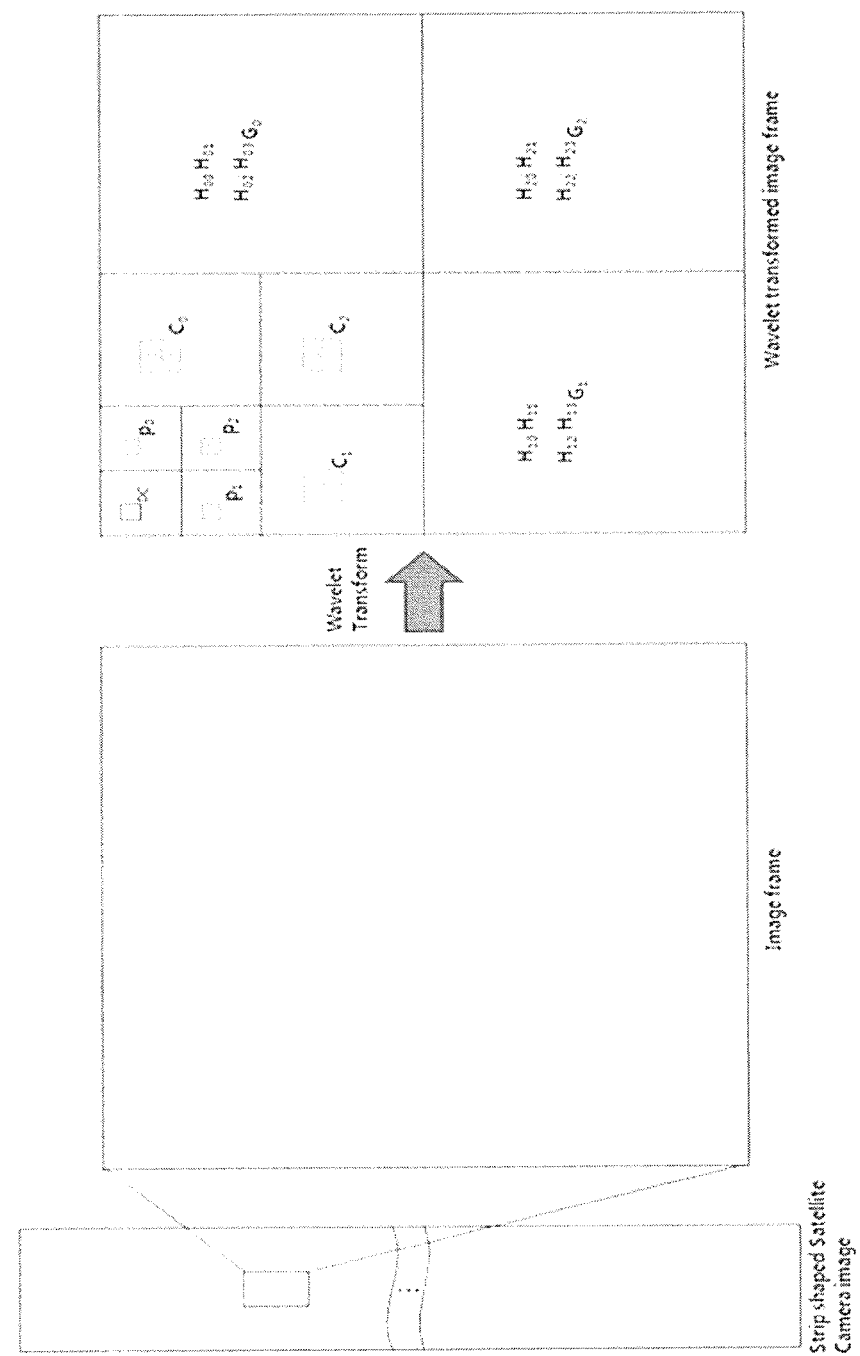
FIG. 5 shows a conceptual diagram of wavelet transform for the strip shaped satellite image data in accordance with a preferred embodiment of the present invention.

FIG. 5 shows a conceptual diagram of wavelet transform for the strip shaped satellite image data recommended in CCSDS. First of all, the strip shaped satellite image data is divided into image frames comprising several lines, wavelet transform is performed for the entire image frame, coefficients are relocated with blocks, blocks are grouped by the unit of segments, each block is zigzag scanned and entropy coded by the unit of bit plane for unit of each segment, and thereby original image cannot be recovered by processing just a single block alone having corresponding image lines like a DCT because there exists relationship among blocks.

For example, if we assume that a 32×32 image frame exists before performing wavelet transform, for the case of performing 3-level wavelet transform for this image frame, firstly a single 16×16 DC block and three high frequency blocks are created (level 1), secondly said single 16×16 DC block is divided into a single 8×8 DC block and 3 high frequency blocks (level 2), and finally said 8×8 DC block is divided into a single 4×4 DC block and three high frequency blocks (level 3).

Figures 6, 7:
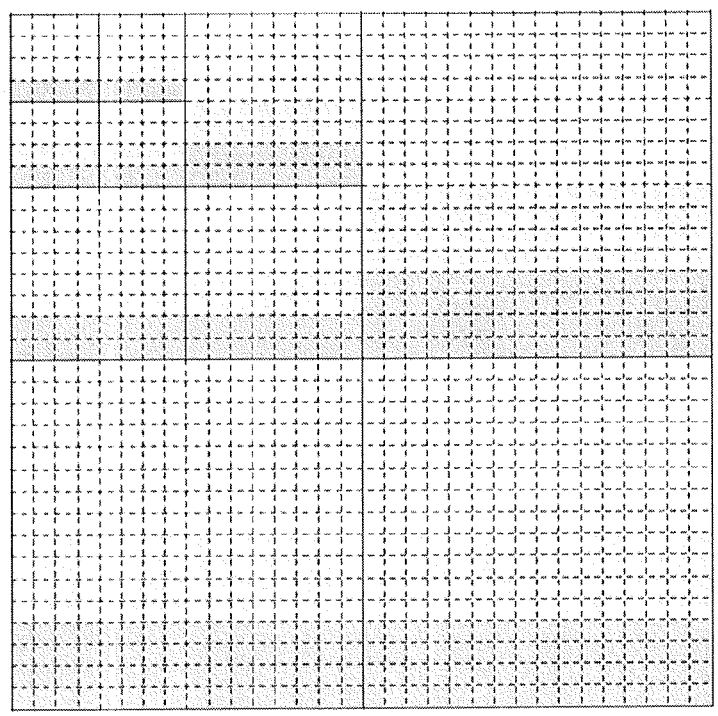
FIG. 6 shows a block diagram of relocating geometrically correlated coefficients in the wavelet transformed image frame in accordance with a preferred embodiment of the present invention.
FIG. 7 shows a diagram illustrating the locations in wavelet transform image frame corresponding to each segment of wavelet transformed image in accordance with a preferred embodiment of the present invention.

From said wavelet transformed image frame, a block comprises 64 subband coefficients, DC, P0, P1, P2, C0, C1, C2, G0, G1, G2, corresponding to a particular area of original image frame, said block comprises as shown in FIG. 6. Therefore, 32×32 sized wavelet transformed image frame creates 16 (4×4) said blocks (8×8), a single segment is created by collecting 4 DC said blocks (8×8) together located at each line of DC blocks, and BPE (Bit Plane Encoding) recommended in CCSDS is to perform encoding by the unit of segment for increasing compression ratio according to correlation among a plurality of said blocks. The compressed image frames as above, are then transmitted to the ground from the first created compressed stream one by one as shown in FIG. 7. FIG. 7 shows a diagram illustrating where the transmitted segments are located in wavelet transformed image frame.

In the compress method recommended in CCSDS, wavelet transform is performed with 3-level, and thus the transform is not independently processed as a whole, but a single DC coefficient corresponds to DC information for 8×8 pixels of original image. Moreover, a single block includes 8×8 pixels of a DC and ACs (high frequency) components.

Figure 8:
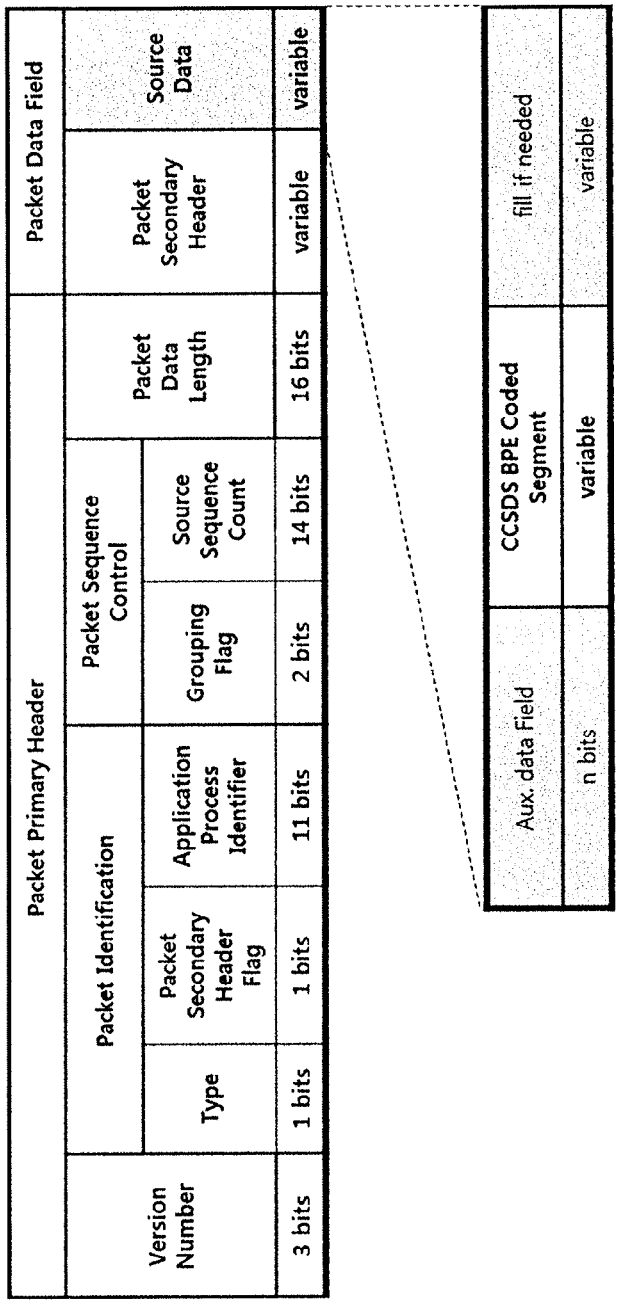
FIG. 8 shows a structure of source packet for indexing segments of compressed satellite image data in accordance with a preferred embodiment of the present invention.

So far, in the flowchart of compressing strip shaped satellite image data with wavelet transform according to CCSDS and transmitting the wavelet transformed image data as shown in FIG. 4, the steps until BPE (Bit Plane Encoding) have been explained. FIG. 8 shows a structure for creating source packet including said BPE coded segments. As shown in FIG. 8, source packet comprises header and packet data field, and said packet data field auxiliary header including aux data length and fill data length information and source data, and said source data comprises CCSDS BPE coded segments, aux data and fill data. In FIG. 8, the real length of CCSDS BPE coded segments can be extracted from packet data length, the header of packet data field and the length of aux data field. In the receiving side, compression section, the start position and the size of the region in line can be extracted from the size information of said segment and line number.

Source packet created as above is encrypted, the encrypted source packet is divided into appropriate packet to be able to be transmitted, VCDU is created, and then transport frame data field comprises said VCDU, to which Reed-Solomon check symbol is added through channel coding. In addition, transport frame is constructed by adding header to said transport frame data field, CASU is created by adding synchronization identifier to the randomized transport frame, and finally successive CASU is transmitted via channel. The structure of such transport frame and consecutive CADU are shown in FIG. 9 and FIG. 10, respectively.

Figure 11:
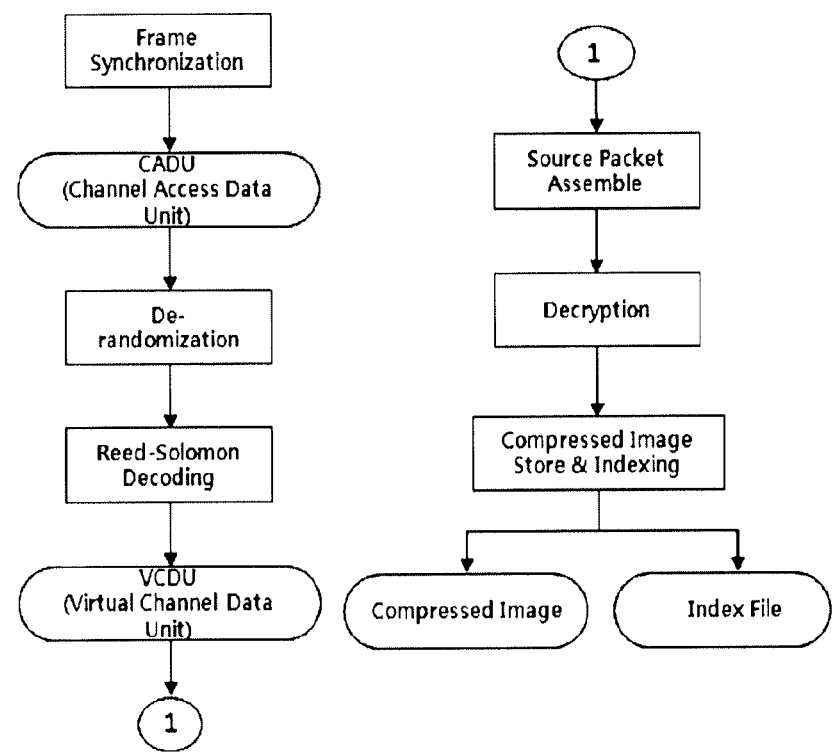
FIG. 11 shows step-by-step process receiving flows of satellite image data and a flowchart of indexing processes of compressed satellite image segments in accordance with a preferred embodiment of the present invention.

So far, the transmission of source packet has been explained, and FIG. 11 shows the flows to receive source packet by using a receiving device meeting CCSDS recommendation (Packet Telemetry: CCSDS 102.0-B-5) and to make index for compression.

1) First, frame synchronization identifier is extracted from received CADU, and frame synchronization is performed, and CADU is extracted. CADU is a data unit used for transmitting data on channel, which has the form attaching synchronization identifier to transport frame in CCSDS (Referring to FIG. 10). Transport frame is extracted from CADU by identifying attached sync. marker (1ACFFC1Dh) with fixed 32-bit pattern.

2) Next, randomized transport frame is de-randomized in order to provide noise robust characteristics for said extracted transport frame, error correction is performed by using Reed-Solomon check symbol, which is attached for the case of being damaged by noise in the course of transmission, said Reed-Solomon check symbol is removed from transport frame, and VCDU is extracted.

3) Source packet separated for transmission is re-assembled by using header of extracted VCDU, encrypted source packet is decrypted and then source packet is extracted.

4) Said decrypted source packet has the structure shown in FIG. 8, and the length information of BPE coded segment is calculated by extracting the length information of packet data included in source packet and the length information of aux data field.

5) The starting position of BPE coded segments stored in receiving device in succession can be index information, the sequence number of image frame and the segments belonged in each image frame can be index information, and the next starting position can be calculated by adding the length information of segments to said starting information. Therefore, the starting position and the length information of each segment in the consecutive compressed stream stored as a file are managed by being stored in the index file in the order of image frame and the sequence number belonged in each image frame.

For a preferred embodiment of the present invention, corresponding segments should be able to be independently recovered from corresponding starting position by referring to index file for any of the BPE-coded segment. However, it is not independent of each other between blocks because the block contains some of the ingredients of adjacent blocks due to the nature of the wavelet transform. Therefore, there needs to look at how much influencing among blocks in the case of performing reverse transform for recovering original image.

In another word, the indexing of compressed image received from satellite will be reasonably performed by figuring out the range of being able to independently perform wavelet transform for the specific segments comprising a plurality of blocks. To do this, the inverse wavelet transform formula needs to be inspected.

Two sets of synthesis filter coefficients, that is, low-pass filter coefficients (qi) and high-pass filter coefficients (pi) are used for 9/7 floating point inverse wavelet transform, and the coefficients are summarized in Table 1. Said synthesis filter coefficients are used for synthesis filtering computation, said the synthesis filtering computation is called as inverse wavelet transform and expressed as shown in Table 1.

TABLE 1

Synthesis filter coefficients

| i | Low-pass filter, $q_i$ | High pass filter, $p_i$ |
|---|---|---|
| 0 | 0.788485616406 | −0.852698679009 |
| 1 | 0.418092273222 | 0.377402855613 |
| 2 | −0.040689417609 | 0.110624404418 |
| 3 | −0.064538882629 | −0.023849465020 |
| 4 |  | −0.037828455507 |

Wherein, [Equation 1] of the signal wavelet coefficients, Cj, and Dj should be extended to subscript, j, j=−m−1 and j=N−1+m=N−1−m, respectively at boundary area (m<0 or m>0).

$$x_{2j} = \sum_{n=-1}^{1} q_{2n} C_{j+n} + \sum_{n=-2}^{1} p_{2n+1} D_{j+n}$$

$$x_{2j+1} = \sum_{n=-1}^{2} q_{2n-1} C_{j+n} + \sum_{n=-2}^{2} p_{2n} D_{j+n}$$

$$(j = 0, 1, \ldots, N-1)$$

[Equation 1]

Next, integer inverse wavelet transform is expressed as [Equation 2], and the processes for mapping two wavelet coefficients, Cj (low-pass filter set) and Dj (high-pass set) to original image signal vector, xj, are listed as the same processes as those of 9/7 floating point inverse wavelet transform.

$$x_0 = C_0 + \left\lfloor -\frac{D_0}{2} + \frac{1}{2} \right\rfloor$$

$$x_{2j} = C_f + \left\lfloor -\frac{D_{j-1} + D_j}{4} + \frac{1}{2} \right\rfloor$$

for $j = 1, \ldots, N-1$ $$x_1 = D_0 + \left\lfloor \frac{9}{16}(x_0 + x_2) - \frac{1}{16}(x_2 + x_4) + \frac{1}{2} \right\rfloor$$

$$x_{2j+1} = D_j + \left\lfloor \frac{9}{16}(x_{2j} + x_{2j+2}) - \frac{1}{16}(x_{2j-2} + x_{2j+4}) + \frac{1}{2} \right\rfloor$$

[Equation 2]

for $j = 1, \ldots, N-3$ $$x_{2N-3} = D_{N-2} + \left\lfloor \frac{9}{16}(x_{2N-4} + x_{2N-2}) - \frac{1}{16}(x_{2N-6} + x_{2N-2}) + \frac{1}{2} \right\rfloor$$

$$x_{2N-1} = D_{N-1} + \left\lfloor \frac{9}{8}x_{2N-2} - \frac{1}{8}x_{2N-4} + \frac{1}{2} \right\rfloor$$

Hereinafter, minimum section required for recovering one segment from the entire image frame will be explained from [Equation 1] and [Equation 2].

In wavelet transform based CCSDS satellite image compression method, image frame size must be a multiple of 8 because the wavelet transform should be performed across 3 levels, and each segment is composed of coefficients, which have geometrical relationship out of wavelet transformed coefficients.

By using these characteristics, image frame prior to performing wavelet transform can be divided into 8 lines as a transform section, and image can be decompressed by using minimum segments with the unit of the transform section. Minimum segments required for decompression need previous 3 segments and next 3 segments as the center segment contains the image to be recovered.

Since partitioned processing using index as described in the present invention is accomplished with line-by-line of image, and row transform and column transform of wavelet transform are independent each other, so only figuring out the influential range of column (direction) inverse transform is enough to derive minimum number of segment required for decompressing image lines associated to a specific segment. Thus, the previous level coefficients required for column direction inverse transform for each level are described in the followings. The notations of the descriptions are explained as follows.

$x_{ij}^{ld}$, 1: level (1, 2, 3), d: direction (c, r), i: row index, j: column index The minimum range required for decompressing one segment of the entire image frame for real number based inverse transform of [Equation 1] and integer number based inverse transform of [Equation 2] is as follows.

1) Level 1 Inverse Transform

As described above, 8 lines of image frame can be associated with each segment. The number of image line associated with a specific segment can be described as follows. s refers to the number of segment.

8s, 8s+1, 8s+2, 8s+3, 8s+4, 8s+5, 8s+6, 8s+7

The above notations can be modified as follows for separately assigning even and odd components to inverse transform basic formula.

8s, 8s+1, 8s+2, 8s+2+1, 8s+4, 8s+4+1, 8s+6, 8s+6+1

Coefficients for level 1 column direction real number and integer inverse transform are summarized as shown [Table 2] and [Table 3].

TABLE 2

| Transform Result | low-pass coefficients | high-pass coefficients |
|---|---|---|
| $x_{8s,j}^{1c}$ | $C_{4s-1,j}^{1c}, C_{4s,j}^{1c}, C_{4s+1,j}^{1c}$ | $D_{4s-2,j}^{1c}, D_{4s-1,j}^{1c}, D_{4s,j}^{1c}, D_{4s+1,j}^{1c}$ |
| $x_{8s+1,j}^{1c}$ | $C_{4s-1,j}^{1c}, C_{4s,j}^{1c}, C_{4s+1,j}^{1c}, C_{4s+2,j}^{1c}$ | $D_{4s-2,j}^{1c}, D_{4s-1,j}^{1c}, D_{4s,j}^{1c}, D_{4s+1,j}^{1c}, D_{4s+2,j}^{1c}$ |
| $x_{8s+2,j}^{1c}$ | $C_{4s,j}^{1c}, C_{4s+1,j}^{1c}, C_{4s+2,j}^{1c}$ | $D_{4s-1,j}^{1c}, D_{4s,j}^{1c}, D_{4s+1,j}^{1c}, D_{4s+2,j}^{1c}$ |
| $x_{8s+3,j}^{1c}$ | $C_{4s,j}^{1c}, C_{4s+1,j}^{1c}, C_{4s+2,j}^{1c}, C_{4s+3,j}^{1c}$ | $D_{4s-1,j}^{1c}, D_{4s,j}^{1c}, D_{4s+1,j}^{1c}, D_{4s+2,j}^{1c}, D_{4s+3,j}^{1c}$ |
| $x_{8s+4,j}^{1c}$ | $C_{4s+1,j}^{1c}, C_{4s+2,j}^{1c}, C_{4s+3,j}^{1c}$ | $D_{4s,j}^{1c}, D_{4s+1,j}^{1c}, D_{4s+2,j}^{1c}, D_{4s+3,j}^{1c}$ |
| $x_{8s+5,j}^{1c}$ | $C_{4s+1,j}^{1c}, C_{4s+2,j}^{1c}, C_{4s+3,j}^{1c}, C_{4s+4,j}^{1c}$ | $D_{4s,j}^{1c}, D_{4s+1,j}^{1c}, D_{4s+2,j}^{1c}, D_{4s+3,j}^{1c}, D_{4s+4,j}^{1c}$ |
| $x_{8s+6,j}^{1c}$ | $C_{4s+2,j}^{1c}, C_{4s+3,j}^{1c}, C_{4s+4,j}^{1c}$ | $D_{4s+1,j}^{1c}, D_{4s+2,j}^{1c}, D_{4s+3,j}^{1c}, D_{4s+4,j}^{1c}$ |
| $x_{8s+7,j}^{1c}$ | $C_{4s+2,j}^{1c}, C_{4s+3,j}^{1c}, C_{4s+4,j}^{1c}, C_{4s+5,j}^{1c}$ | $D_{4s+1,j}^{1c}, D_{4s+2,j}^{1c}, D_{4s+3,j}^{1c}, D_{4s+4,j}^{1c}, D_{4s+5,j}^{1c}$ |

TABLE 3

| Transform Result | low-pass coefficients | high-pass coefficients |
|---|---|---|
| $x_{8s,j}^{1c}$ | $C_{4s,j}^{1c}$ | $D_{4s-1,j}^{1c}, D_{4s,j}^{1c}$ |
| $x_{8s+1,j}^{1c}$ | $C_{4s-1,j}^{1c}, C_{4s,j}^{1c}, C_{4s+1,j}^{1c}, C_{4s+2,j}^{1c}$ | $D_{4s-2,j}^{1c}, D_{4s-1,j}^{1c}, D_{4s,j}^{1c}, D_{4s+1,j}^{1c}, D_{4s+2,j}^{1c}$ |
| $x_{8s+2,j}^{1c}$ | $C_{4s+1,j}^{1c}$ | $D_{4s,j}^{1c}, D_{4s+1,j}^{1c}$ |
| $x_{8s+3,j}^{1c}$ | $C_{4s,j}^{1c}, C_{4s+1,j}^{1c}, C_{4s+2,j}^{1c}, C_{4s+3,j}^{1c}$ | $D_{4s-1,j}^{1c}, D_{4s,j}^{1c}, D_{4s+1,j}^{1c}, D_{4s+2,j}^{1c}, D_{4s+3,j}^{1c}$ |
| $x_{8s+4,j}^{1c}$ | $C_{4s+2,j}^{1c}$ | $D_{4s+1,j}^{1c}, D_{4s+2,j}^{1c}$ |
| $x_{8s+5,j}^{1c}$ | $C_{4s+1,j}^{1c}, C_{4s+2,j}^{1c}, C_{4s+3,j}^{1c}, C_{4s+4,j}^{1c}$ | $D_{4s,j}^{1c}, D_{4s+1,j}^{1c}, D_{4s+2,j}^{1c}, D_{4s+3,j}^{1c}, D_{4s+4,j}^{1c}$ |
| $x_{8s+6,j}^{1c}$ | $C_{4s+3,j}^{1c}$ | $D_{4s+2,j}^{1c}, D_{4s+3,j}^{1c}$ |
| $x_{8s+7,j}^{1c}$ | $C_{4s+2,j}^{1c}, C_{4s+3,j}^{1c}, C_{4s+4,j}^{1c}, C_{4s+5,j}^{1c}$ | $D_{4s+1,j}^{1c}, D_{4s+2,j}^{1c}, D_{4s+3,j}^{1c}, D_{4s+4,j}^{1c}, D_{4s+5,j}^{1c}$ |

As shown in [Table 2] and [Table 3], maximum previous 2 and next 3 coefficients are required for 4s stage coefficients as a center. Since the number of coefficients corresponding to one segment in level 1 transform is 4, minimum number of segment required for being decompressed in this stage is previous 1 and next 1 segments. In other words, if s is 1, 2, 3, 4, 5, 6, 7, 8, 9th coefficients are needed, 4~7th coefficients belong to current segment. Both one segment for the previous 2~3th coefficients and one segment for the 8~9th coefficients are required for being compressed.

2) Level-2 Inverse Transform

Only low-pass components in level 1 transform are related in level 2 inverse transform, and thus the following coefficients for deriving low-pass coefficients are enough to be considered.

$C_{4s-1,j}^{3c}, C_{4s,j}^{1c}, C_{4s+1,j}^{1c}, C_{4s+2,j}^{1c}, C_{4s+3,j}^{1c}, C_{4s+4,j}^{1c}, C_{4s+5,j}^{1c}$

The results of level 2 inverse transform corresponding to the above coefficients are as follows.

$x_{4s-1,j}^{2c}, x_{4s,j}^{2c}, x_{4s+1,j}^{2c}, x_{4s+2,j}^{2c}, x_{4s+3,j}^{2c}, x_{4s+4,j}^{2c}, x_{4s+5,j}^{2c}$

Coefficients required for level 2 column direction real number and integer number inverse transform are summarized as shown in [Table 4] and [Table 5].

TABLE 4

| Transform Result | low-pass coefficients | high-pass coefficients |
|---|---|---|
| $x_{4s-1,j}^{2c}$ | $C_{2s-2,j}^{2c}, C_{2s-1,j}^{2c}, C_{2s,j}^{2c}, C_{2s+1,j}^{2c}$ | $D_{2s-3,j}^{2c}, D_{2s-2,j}^{2c}, D_{2s-1,j}^{2c}, D_{2s,j}^{2c}, D_{2s+1,j}^{2c}$ |
| $x_{4s,j}^{2c}$ | $C_{2s-1,j}^{2c}, C_{2s,j}^{2c}, C_{2s+1,j}^{2c}$ | $D_{2s-2,j}^{2c}, D_{2s-1,j}^{2c}, D_{2s,j}^{2c}, D_{2s+1,j}^{2c}$ |
| $x_{4s+1,j}^{2c}$ | $C_{2s-1,j}^{2c}, C_{2s,j}^{2c}, C_{2s+1,j}^{2c}, C_{2s+2,j}^{2c}$ | $D_{2s-2,j}^{2c}, D_{2s-1,j}^{2c}, D_{2s,j}^{2c}, D_{2s+1,j}^{2c}, D_{2s+2,j}^{2c}$ |
| $x_{4s+2,j}^{2c}$ | $C_{2s,j}^{2c}, C_{2s+1,j}^{2c}, C_{2s+2,j}^{2c}$ | $D_{2s-1,j}^{2c}, D_{2s,j}^{2c}, D_{2s+1,j}^{2c}, D_{2s+2,j}^{2c}$ |
| $x_{4s+3,j}^{2c}$ | $C_{2s,j}^{2c}, C_{2s+1,j}^{2c}, C_{2s+2,j}^{2c}, C_{2s+3,j}^{2c}$ | $D_{2s-1,j}^{2c}, D_{2s,j}^{2c}, D_{2s+1,j}^{2c}, D_{2s+2,j}^{2c}, D_{2s+3,j}^{2c}$ |
| $x_{4s+4,j}^{2c}$ | $C_{2s+1,j}^{2c}, C_{2s+2,j}^{2c}, C_{2s+3,j}^{2c}$ | $D_{2s,j}^{2c}, D_{2s+1,j}^{2c}, D_{2s+2,j}^{2c}, D_{2s+3,j}^{2c}$ |
| $x_{4s+5,j}^{2c}$ | $C_{2s+1,j}^{2c}, C_{2s+2,j}^{2c}, C_{2s+3,j}^{2c}, C_{2s+2,j}^{2c}$ | $D_{2s,j}^{2c}, D_{2s+1,j}^{2c}, D_{2s+2,j}^{2c}, D_{2s+3,j}^{2c}, D_{2s+2,j}^{2c}$ |

TABLE 5

| Transform Result | low-pass coefficients | high-pass coefficients |
|---|---|---|
| $x_{4s-1,j}^{2c}$ | $C_{2s-2,j}^{2c}, C_{2s-1,j}^{2c}, C_{2s,j}^{2c}, C_{2s+1,j}^{2c}$ | $D_{2s-3,j}^{2c}, D_{2s-2,j}^{2c}, D_{2s-1,j}^{2c}, D_{2s,j}^{2c}, D_{2s+1,j}^{2c}$ |
| $x_{4s,j}^{2c}$ | $C_{2s,j}^{2c}$ | $D_{2s-2,j}^{2c}, D_{2s,j}^{2c}$ |
| $x_{4s+1,j}^{2c}$ | $C_{2s-1,j}^{2c}, C_{2s,j}^{2c}, C_{2s+1,j}^{2c}, C_{2s+2,j}^{2c}$ | $D_{2s-2,j}^{2c}, D_{2s-1,j}^{2c}, D_{2s,j}^{2c}, D_{2s+1,j}^{2c}, D_{2s+2,j}^{2c}$ |
| $x_{4s+2,j}^{2c}$ | $C_{2s+1,j}^{2c}$ | $D_{2s,j}^{2c}, D_{2s+1,j}^{2c}$ |
| $x_{4s+3,j}^{2c}$ | $C_{2s,j}^{2c}, C_{2s+1,j}^{2c}, C_{2s+2,j}^{2c}, C_{2s+3,j}^{2c}$ | $D_{2s-1,j}^{2c}, D_{2s,j}^{2c}, D_{2s+1,j}^{2c}, D_{2s+2,j}^{2c}, D_{2s+3,j}^{2c}$ |
| $x_{4s+4,j}^{2c}$ | $C_{2s+2,j}^{2c}$ | $D_{2s+1,j}^{2c}, D_{2s+2,j}^{2c}$ |
| $x_{4s+5,j}^{2c}$ | $C_{2s+1,j}^{2c}, C_{2s+2,j}^{2c}, C_{2s+3,j}^{2c}, C_{2s+4,j}^{2c}$ | $D_{2s,j}^{2c}, D_{2s+1,j}^{2c}, D_{2s+2,j}^{2c}, D_{2s+3,j}^{2c}, D_{2s+4,j}^{2c}$ |

As shown in [Table 4] and [Table 5], maximum previous 3 and next 4 coefficients are required for 2sth coefficients as a center. Since the number of coefficients corresponding to one segment in level 2 transform is 2, minimum number of segment required for being decompressed in this stage is previous 2 and next 2 segments. In other words, if s is 2, 1, 2, 3, 4, 5, 6, 7, 8th coefficients are needed. And both two segments for the 1~3th coefficients and two segments for the 6~9th coefficients are required for being compressed in current segment for 4~5th coefficients.

3) Level 3 Inverse Transform

Only low-pass components in level 2 transform are related in level 3 inverse transform, and thus the following coefficients for deriving low-pass coefficients are enough to be considered.

$C_{2s-2,j}^{2c}$, $C_{2s-1,j}^{2c}$, $C_{2s,j}^{2c}$, $C_{2s+1,j}^{2c}$, $C_{2s+2,j}^{2c}$, $C_{2s+3,j}^{2c}$, $C_{2s+4,j}^{2c}$

The results of level 3 inverse transform corresponding to the above coefficients are as follows.

$x_{2s-2,j}^{3c}$, $x_{2s-1,j}^{3c}$, $x_{2s,j}^{3c}$, $x_{2s+1,j}^{3c}$, $x_{2s+2,j}^{3c}$, $x_{2s+3,j}^{3c}$, $x_{2s+4,j}^{3c}$

Coefficients required for level 3 column direction real number and integer number inverse transform are summarized as shown in [Table 6] and [Table 7].

TABLE 6

| Transform Result | low-pass coefficients | high-pass coefficients |
|---|---|---|
| $x_{2s-2,j}^{3c}$ | $C_{s-2,j}^{3c}, C_{s-1,j}^{3c}, C_{s,j}^{3c}$ | $D_{s-3,j}^{3c}, D_{s-2,j}^{3c}, D_{s-1,j}^{3c}, D_{s,j}^{3c}$ |
| $x_{2s-1,j}^{3c}$ | $C_{s-2,j}^{3c}, C_{s-1,j}^{3c}, C_{s,j}^{3c}, C_{s+1,j}^{3c}$ | $D_{s-3,j}^{3c}, D_{s-2,j}^{3c}, D_{s-1,j}^{3c}, D_{s,j}^{3c}, D_{s+1,j}^{3c}$ |
| $x_{2s,j}^{3c}$ | $C_{s-1,j}^{3c}, C_{s,j}^{3c}, C_{s+1,j}^{3c}$ | $D_{s-2,j}^{3c}, D_{s-1,j}^{3c}, D_{s,j}^{3c}, D_{s+1,j}^{3c}$ |
| $x_{2s+1,j}^{3c}$ | $C_{s-1,j}^{3c}, C_{s,j}^{3c}, C_{s+1,j}^{3c}, C_{s+2,j}^{3c}$ | $D_{s-2,j}^{3c}, D_{s-1,j}^{3c}, D_{s,j}^{3c}, D_{s+1,j}^{3c}, D_{s+2,j}^{3c}$ |
| $x_{2s+2,j}^{3c}$ | $C_{s,j}^{3c}, C_{s+1,j}^{3c}, C_{s+2,j}^{3c}$ | $D_{s-1,j}^{3c}, D_{s,j}^{3c}, D_{s+1,j}^{3c}, D_{s+2,j}^{3c}$ |
| $x_{2s+3,j}^{3c}$ | $C_{s,j}^{3c}, C_{s+1,j}^{3c}, C_{s+2,j}^{3c}, C_{s+3,j}^{3c}$ | $D_{s-1,j}^{3c}, D_{s,j}^{3c}, D_{s+1,j}^{3c}, D_{s+2,j}^{3c}, D_{s+3,j}^{3c}$ |
| $x_{2s+4,j}^{3c}$ | $C_{s+1,j}^{3c}, C_{s+2,j}^{3c}, C_{s+3,j}^{3c}$ | $D_{s,j}^{3c}, D_{s+1,j}^{3c}, D_{s+2,j}^{3c}, D_{s+3,j}^{3c}$ |

TABLE 7

| Transform Result | low-pass coefficients | high-pass coefficients |
|---|---|---|
| $x_{2s-2,j}^{3c}$ | $C_{s-1,j}^{3c}$ | $D_{s-2,j}^{3c}, D_{s-1,j}^{3c}$ |
| $x_{2s-1,j}^{3c}$ | $C_{s-2,j}^{3c}, C_{s-1,j}^{3c}, C_{s,j}^{3c}, C_{s+1,j}^{3c}$ | $D_{s-3,j}^{3c}, D_{s-2,j}^{3c}, D_{s-1,j}^{3c}, D_{s,j}^{3c}, D_{s+1,j}^{3c}$ |
| $x_{2s,j}^{3c}$ | $C_{s,j}^{3c}$ | $D_{s-1,j}^{3c}, D_{s,j}^{3c}$ |
| $x_{2s+1,j}^{3c}$ | $C_{s-1,j}^{3c}, C_{s,j}^{3c}, C_{s+1,j}^{3c}, C_{s+2,j}^{3c}$ | $D_{s-2,j}^{3c}, D_{s-1,j}^{3c}, D_{s,j}^{3c}, D_{s+1,j}^{3c}, D_{s+2,j}^{3c}$ |
| $x_{2s+2,j}^{3c}$ | $C_{s+1,j}^{3c}$ | $D_{s,j}^{3c}, D_{s+1,j}^{3c}$ |
| $x_{2s+3,j}^{3c}$ | $C_{s,j}^{3c}, C_{s+1,j}^{3c}, C_{s+2,j}^{3c}, C_{s+3,j}^{3c}$ | $D_{s-1,j}^{3c}, D_{s,j}^{3c}, D_{s+1,j}^{3c}, D_{s+2,j}^{3c}, D_{s+3,j}^{3c}$ |
| $x_{2s+4,j}^{3c}$ | $C_{s+2,j}^{3c}$ | $D_{s+1,j}^{3c}, D_{s+2,j}^{3c}$ |

As shown in [Table 6] and [Table 7], maximum previous 3 and next 3 coefficients are required for sth coefficients as a center. Since the number of coefficients corresponding to one segment in level 3 inverse transform is 1, minimum number of segment required for being decompressed in this stage is previous 3 and next 3 segments.

Based on the results of the above analysis, in order to decompress a particular area, there need physical storage position and length information of the segment corresponding to the area ranged from beginning segment number −3 to ending segment number +3, not just the segment corresponding to the area ranged from the beginning segment number to the ending segment number. The index information of the present invention is generated to identify the physical position information of each segment to be actually read in consideration of the above characteristics.

In conclusions, the storage position of any BPE coded segment in the present invention can be stored to be indexed by using the information included in source packet, and the satellite image can be quickly serviced to customers by decompressing the corresponding segment as independently as possible by referring to the storage position for accessing said segment stored in said indexed position. In other words, conventionally compressed satellite image is received and decompressed, and then satellite image product is produced for the final customers after performing some parts of correction processes. However, in the present invention, the compressed satellite image is stored in the state of being un-decompressed and the image area required for production can be separately processed by accessing randomly to the compressed image section corresponding to the area requested by customers. Moreover, conventionally the entire transformed image frame should be decoded and inverse transformed in order to decode and inverse transform any BPE encoded segment due to the characteristics of wavelet transform performing wavelet transform the image frame-by-frame. However, in the present invention, said any BPE encoded segment can be decompressed by referring to only previous and next 3 segments more than the beginning number of said any BPR encoded segment.

While the invention has been disclosed with respect to a limited number of embodiments and explained by referring to embodiments illustrated in accompanying drawings, a person skilled in the art, having the benefit of this disclosure, will comprehend numerous and equivalent modifications and variations therefrom. It is intended that the appended claims cover all such modifications and variations as fall within the true spirit and scope of the present invention.

What is claimed is:

1. An apparatus having a processor for partitioned processing of compressed satellite images, wherein the processor causes the apparatus to:

receive, using the processor, a source packet including high resolution wavelet transformed compressed satellite image segments continuously transmitted from satellites;

extract, using the processor, compressed satellite image segments and length information of the high resolution wavelet transformed compressed satellite image segments from the received source packet;

generate, using the processor, an index of the compressed satellite image segments using the length information and a consecutive beginning position; and store, in a storage unit, the compressed satellite image segments and the generated index.

2. The apparatus according to claim 1, wherein the source packet further comprises:
variable sized compressed satellite image segments;
source data comprising an auxiliary data field,
the auxiliary data field comprising attitude and position information of a satellite;
packet data comprising header data,
the header data comprising property information of the source data and the length information of the source packet.

3. The apparatus according to claim 1, wherein at least one of the compressed satellite image segments is generated through wavelet transform and BPE (bit plane encoding).

4. The apparatus according to claim 1, wherein the consecutive beginning position is calculated by extracting a consecutive beginning position of a next compressed satellite image segment by adding a beginning position of a previous compressed satellite image segments to a length of the previous compressed satellite image segment.

5. The apparatus according to claim 1, wherein the stored compressed satellite image segments are independently decompressed by additionally referring to previous 3 segments and next 3 segments.

6. A method for partitioned processing of compressed satellite images, the method comprising:
receiving a source packet including high resolution wavelet transformed compressed satellite image segments continuously transmitted from one or more satellites;
extracting compressed satellite image segments and length information of the said compressed satellite image segments from the received source packet;
generating an index of the compressed satellite image segments by using the length information and a consecutive beginning position; and
storing the compressed satellite image segments and the generated index.

7. The method according to claim 6, wherein the source packet further comprises:
variable sized compressed satellite image segments;
source data an comprising auxiliary data field,
the auxiliary data field comprising attitude and position information of a satellite;
packet data comprising header data,
the header data comprising property information of the source data and length information of the source packet.

8. The method according to claim 6, wherein the compressed satellite image segments are generated through wavelet transform and BPE (bit plane encoding).

9. The method according to claim 6, wherein consecutive beginning position is calculated by extracting consecutive beginning position of a next compressed satellite image segment by adding a beginning position of a previous compressed satellite image segment to a length of the previous compressed satellite image segment.

10. The method according to claim 6, wherein the stored compressed satellite image segments are independently decompressed by additionally referring to previous 3 segments and next 3 segments.

* * * * *